March 15, 1938.   J. NORMAN   2,111,001

INDICATING POINTER FOR USE IN ELECTRICAL MEASURING INSTRUMENTS

Filed Nov. 13, 1936

INVENTOR
J. NORMAN
BY H. R. Whitehorn
ATTORNEY

Patented Mar. 15, 1938

2,111,001

UNITED STATES PATENT OFFICE 2,111,001

INDICATING POINTER FOR USE IN ELECTRICAL MEASURING INSTRUMENTS

John Norman, Cicero, Ill., assignor to Western Electric Company, Incorporated, New York, N. Y., a corporation of New York Application November 13, 1936, Serial No. 110,703

1 Claim. (Cl. 116—129)

This invention relates to an indicating pointer for use in electrical measuring instruments, and more particularly to a balancing mechanism for such indicating pointers.

In the operation of electric meters and similar measuring apparatus, it is desirable to maintain the moving element of the instrument in accurate static balance and to adjust the balance periodically to accommodate variations in characteristics and service.

An object of this invention is to provide improved and readily adjustable apparatus for balancing the moving element in electrical measuring instruments.

In accordance with one embodiment of the invention an electrical meter is provided with a balancing mechanism comprising a series of transversely fluted arms extending from the moving element of the meter, and a plurality of weights supported on the arms, the weights comprising helical springs each having a loop formed in one end thereof for resiliently engaging a selective flute in the arm.

A complete understanding of the invention may be had by reference to the following detailed description and the accompanying drawing, in which—

Figure 1:
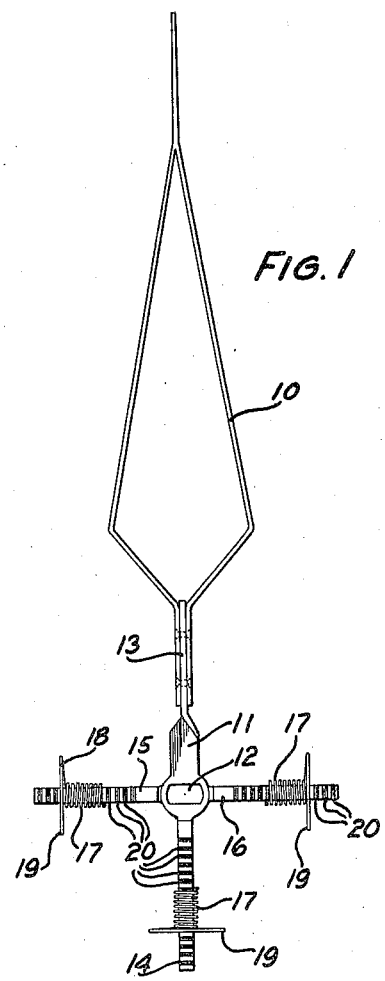
Fig. 1 is a plan view of a meter pointer provided with a balancing mechanism embodying the invention.
Figure 2:
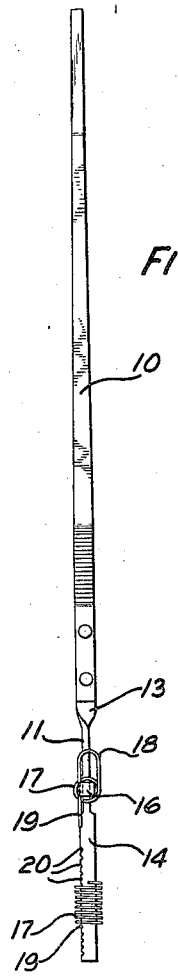
Fig. 2 is a side view of the apparatus shown in Fig. 1.
Figure 3:
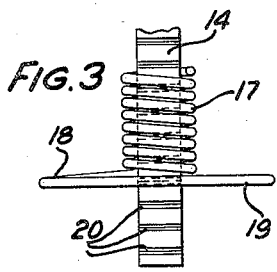
Fig. 3 is an enlarged fragmentary view of one arm of the apparatus shown in Fig. 1.

Referring now to the drawing, an elongated formed pointer or indicating needle 10, of the type generally used in electric meters is supported on a balancing cross 11 which is secured to an actuating element (not shown). The balancing cross has a body with a central aperture 12 for engaging a bearing (not shown) on which the assembly is pivoted and four equally spaced arms extending from the body in one plane. One of the arms 13 extends vertically upward for supporting the pointer which is riveted or otherwise secured thereto. A lower vertical arm 14 and two opposed horizontal arms 15 and 16 are equal in length and are preferably rectangular in section. The pointer may be made of aluminum or other light material and the cross formed of brass or other easily machineable metal.

Figure 4:
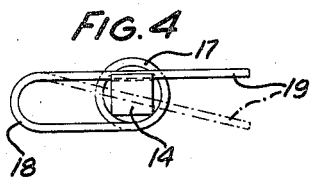
Fig. 4 is an end view of the apparatus shown in Fig. 3.

This general type of balancing arm is well known and the invention is directed to the construction of weights supported on the arms and means for adjustably positioning the weights. The weights are conveniently and economically formed from a length of wire. The wire is wound into a helical coil 17 having an inside diameter slightly larger than the diagonal of the arm so that the coil will be supported but freely moveable on the arm. At the end of the coil the wire is formed into a loop 18 terminating in a straight end portion 19 which normally extends within the coil periphery as shown by the dotted line in Fig. 4.

When the weight is placed on the arm the straight end portion is distorted from its normal position and held resiliently against the arm surface. The weights are preferably made of bronze or other non-magnetic composition wire usually used for springs and the loop is formed to impart the desired resiliency to the straight portion.

In order to position the weight accurately and securely, a series of equally spaced parallel flutes or serrations 20 are cut in one surface of the arm for engaging and holding the straight end portion. The flutes or grooves extend for approximately the full length of the arm, permitting the weight to be anchored at any desired position along the arm. For some applications the resiliency in the loop will retain the weight on the arm without the grooves, but their use increases the security of the balance setting during movement of the pointer, and, as they are spaced uniformly, they facilitate location of the weights at measured intervals.

For adjustment of balance the weights are readily shifted by lifting the straight end of the loop free of the flutes and sliding the weight along the arm to a new position, as established by another groove. For accessibility the grooves are located in the front faces of the arms.

In cases where the characteristics of the instrument will not permit a sufficiently refined balance adjustment with weights positioned in one series of flutes, a supplementary series is cut in another side of the arm in staggered relation to the first series to permit location of the weight at intermediate positions.

The weights are readily made to a predetermined value by careful selection of the wire from which the weight is formed. For convenience, a slightly excess length of wire is used and the weight is calibrated to final value by cutting sections from the end of the coil.

Although a specific structure suitable for a particular application has been described, it is to be understood that other adaptations are feasible and that the invention is limited only by the scope of the following claim.

What is claimed is:

In an indicating pointer for use in electrical measuring instruments, a central body portion for mounting the pointer in the electrical instrument, four equally spaced arms extending radially from the body portion, three of said arms each having a rectangular cross section and a series of transverse parallel flutes in the arm surface, an elongated indicating member secured to the fourth arm, and individual balancing weights supported on the fluted arms, each weight comprising a helical coil having an inside diameter larger than the diagonal of the arm for encircling the arm and an enlarged loop at one end of the coil terminating in an elongated straight portion for resiliently engaging one of the flutes to position the weight.

JOHN NORMAN.